United States Patent [19]

Runion

[11] Patent Number: 5,626,095
[45] Date of Patent: May 6, 1997

[54] POULTRY FEED CONVEYOR SYSTEM

[76] Inventor: Derwood L. Runion, Rte. 2, Box 300, Timberville, Va. 22853

[21] Appl. No.: 356,657

[22] Filed: Dec. 15, 1994

[51] Int. Cl.$^6$ .................................................... A01K 5/00
[52] U.S. Cl. ............................................................ 119/57.2
[58] Field of Search ................................ 119/57.2, 57.3, 119/57.92, 56.2

[56] References Cited

U.S. PATENT DOCUMENTS

| | | |
|---|---|---|
| 2,563,321 | 8/1951 | Dugan . |
| 2,738,766 | 3/1956 | Hart .................................. 119/57.2 |
| 2,956,667 | 10/1960 | Coulliette et al. . |
| 2,984,338 | 5/1961 | Pockman et al. ................. 119/57.2 |
| 2,995,109 | 8/1961 | Cordis ............................... 119/57.2 |
| 3,101,070 | 8/1963 | Cordis ............................... 119/57.2 |
| 3,199,493 | 8/1965 | Hart .................................. 119/57.2 |
| 3,543,283 | 11/1970 | Cataline .......................... 1198/57.2 |
| 3,749,062 | 7/1973 | Pirovano .......................... 119/57.2 |
| 3,962,996 | 6/1976 | Jones et al. ...................... 119/57.2 |
| 4,207,838 | 6/1980 | Pirovano .......................... 119/57.2 |
| 4,391,361 | 7/1983 | Hall et al. ........................ 119/57.2 |
| 4,395,973 | 8/1983 | Hall et al. ........................ 119/57.2 |
| 4,640,230 | 2/1987 | Van Rooijen .................... 119/57.2 |

*Primary Examiner*—Robert P. Swiatek
*Assistant Examiner*—Yvonne R. Abbott
*Attorney, Agent, or Firm*—Ryan M. Fountain

[57] ABSTRACT

An endless conveyor system is provided, particularly for poultry feeding systems, having a single strand wire core coated by a plastic material with integrally formed disks along the length of the wire to engage and transport fluidized or granular material. The disks have projections on their periphery to reduce sliding friction in the channel or trough of usage. A chain drive arrangement is provided to supply linear motive force to the conveyor by simultaneously engaging a plurality of the disks along the same line of travel. A feed input agitator is provided which is driven by conveyor motion. The conveyor can include a shear pin connection at the wire ends.

18 Claims, 5 Drawing Sheets

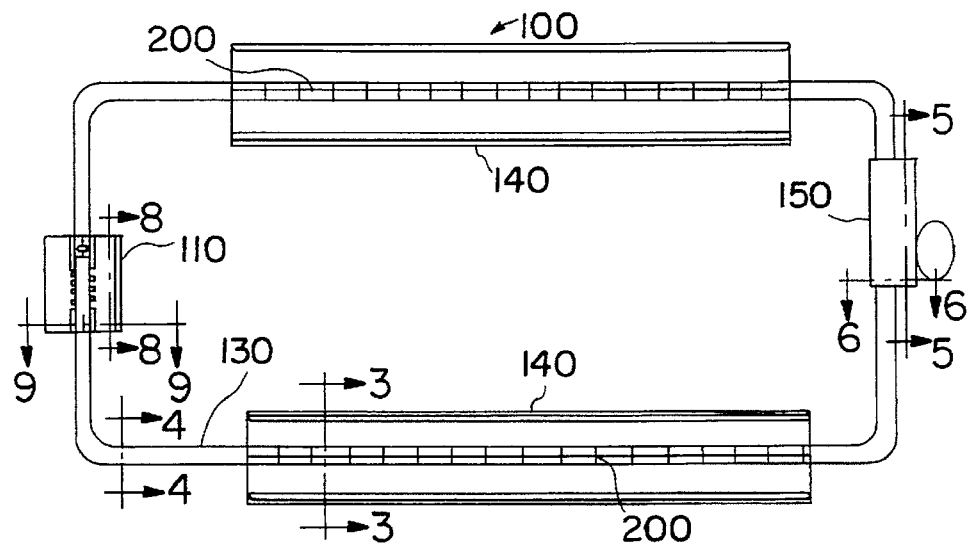
FIG. 1
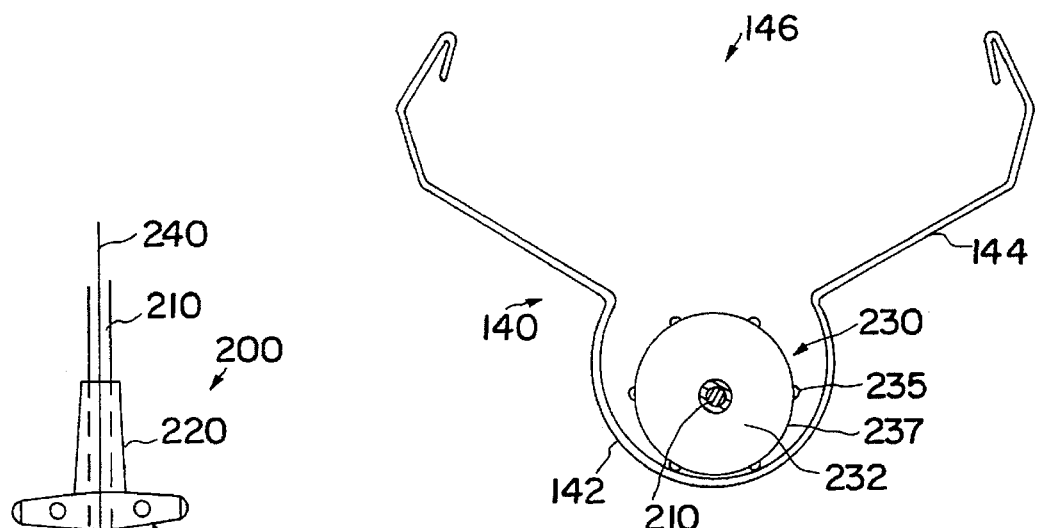
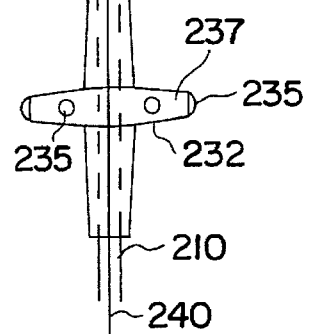
FIG. 2
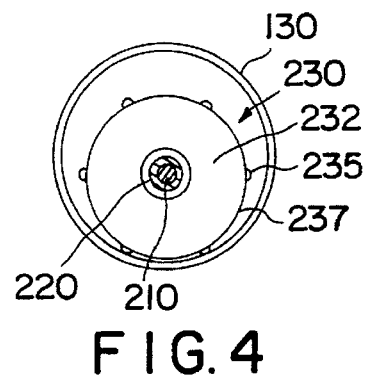
FIG. 3
FIG. 4

POULTRY FEED CONVEYOR SYSTEM

BACKGROUND AND SUMMARY OF THE INVENTION

The present invention relates generally to material handling equipment for fluidized solids and granular material, and more particularly, to poultry feed conveyor systems.

A wide variety of conveyor systems are presently known for providing feed to poultry and other animals. Some of these systems use a plurality of discrete conveyors in series to move the feed along each segment of its path from the feed supply to the dispensing area, usually a poultry house having a floor system or a cage system for raising poultry. Such systems usually require separate electric motors or drive units for each conveyor. To minimize the number of conveyors, drive units and overall system complexity, some prior systems have used "endless" flexible conveyors in place of several conveyors in series. Endless-type conveyors are often used to move the feed through a loop path between the feed supply and the poultry house. The present invention presents an improvement in endless conveyors systems that can be used to feed poultry and other animals as well as to transport other fluidized solids and granular materials.

In general, poultry feeding systems should be reliable and rugged to run intermittently for significant periods of time in rough, poultry house environments. Maintenance needs should be minimal to reduce the labor effort in raising poultry and in repair part costs. At the same time, the overall system is preferably inexpensive and easy to operate without extensive training, fool proof to the extent reasonably possible. Further, the portion of the conveyor in contact with the feed should be easy to clean and keep sanitary.

Currently, some endless conveyor poultry systems employ a centerless auger mounted in a trough (and/or tube) and powered by one or more drive sprockets. These conveyors are capable of continuously mixing the feed over the length of the trough because of the constant rotation of the auger. Unfortunately, since such augers are, in effect, spring-like coils, they have been found to kink and stretch under stress. In part, this is believed to result because the drive sprockets typically engage the auger at a single point per drive unit and exert significant downward pressure at that point. This stretching and kinking can create binding and undesirable stresses in the troughs and tube receptacles through which the augers are run. Accordingly, it is very important that proper sizing be established between the auger and the trough, and periodic adjustments are often necessary. Further, multiple drive units engaging the auger at different locations along its length are sometimes needed to achieve consistent and necessary flow rates. Thus, initial equipment and maintenance as well as operating costs can be relatively high while reliability is not assured.

Other endless conveyor poultry systems have employed a cable formed from a plurality of twisted or braided strands of metal wire. Disks, cups or other types of projections are attached to the cable at spaced apart locations along the cable to carry the feed as the cable is moved. Various types of drive units have been suggested to move the cable through the trough. In some prior devices of this type the cable is wrapped around all or part of one or more rotating drive wheels. Also, special structures are included to accommodate the projections without damage when adjacent the drive wheel. Unfortunately, conveyors based on a cable core have been found to stretch over time and usage. Thus, special tensioning and idler wheels supporting the cable have been needed to maintain proper tension and conveyor sizing. Further, it has been found that the projections attached to the cable have a tendency to slip along the cable or become detached entirely. Also, cable based conveyors can "ride up" on the feed and lose feed mixing capacity if not specially constrained, and such constraints can render tensioning and length adjustment more difficult as well as become a jamming point for loose projections on the cable. Thus, such conveyors have not been sufficiently easy to operate and have suffered relatively high maintenance and operational costs.

Still other endless conveyors for poultry feed have been created from a plurality of specially formed links having integral projections. These may avoid the problem of inadvertent detachment of the projections, but the cost of production and assembly of such devices can be prohibitive. In addition, the multitude of inter-link connections makes cleaning and sanitation more difficult.

Accordingly, it is an object of the present invention to provide an improved method and apparatus for feeding poultry by way of endless conveyors. Additional objects of the present invention include the provision of a:

a. simplified conveyor construction that is inexpensive to manufacture, operate and maintain, b. lightweight feed conveyor system with reliable mixing capacity and ease of cleaning, c. conveyor system with minimal stretch in its length over the usual period and intensity of use, d. drive trait for a conveyor system that is reliable, efficient and applies minimal destructive stress to the conveyor, e. material handling and transporting system with reduced opportunity to jam either its conveyor mechanism or the materials being conveyed, and f. poultry feeding apparatus with widespread applicability and adaptability to pre-existing structures.

These and other objects of the present invention are attained in the provision of an endless conveyor having a single strand wire core covered with a plastic coating, such as nylon, molded onto the core and having integrally formed disks, spools or cups at spaced apart locations thereon to carry the feed or other fluidized material. The disks are formed with a plurality of projections about their peripheries to minimize sliding friction with the trough. The wire is joined at its ends with a shear pin or set screw connection arrangement. A chain drive arrangement is provided to apply motive force to a plurality of the disks simultaneously and along the same line of travel. The trough or tube into which the core is inserted can be coated with a low friction material, and a feed remixing sleeve, through which the core is moved, can be mounted at desired locations along the trough. An agitator for input feed can be employed and driven by core motion to prevent jamming of the feed at the input.

Other objects, advantages and novel features of the present invention will now become readily apparent to those of skill in the art from the following drawings and detailed description.

BRIEF DESCRIPTION OF THE DRAWINGS

FIG. 1 shows generally a top view of an endless conveyor system for feeding poultry which incorporates the present invention.

FIG. 2 shows an enlarged top view of a portion of the endless conveyor used in the embodiment of FIG. 1 with portions of the coating removed to expose the wire core.

FIG. 3 shows a cross sectional view of the trough portion of the conveyor system taken along lines 3—3 of FIG. 1.

FIG. 4 shows a cross sectional view of the channel portion of the conveyor system taken along lines 4—4 of FIG. 1.

DESCRIPTION OF PREFERRED EMBODIMENTS

Figure 5:
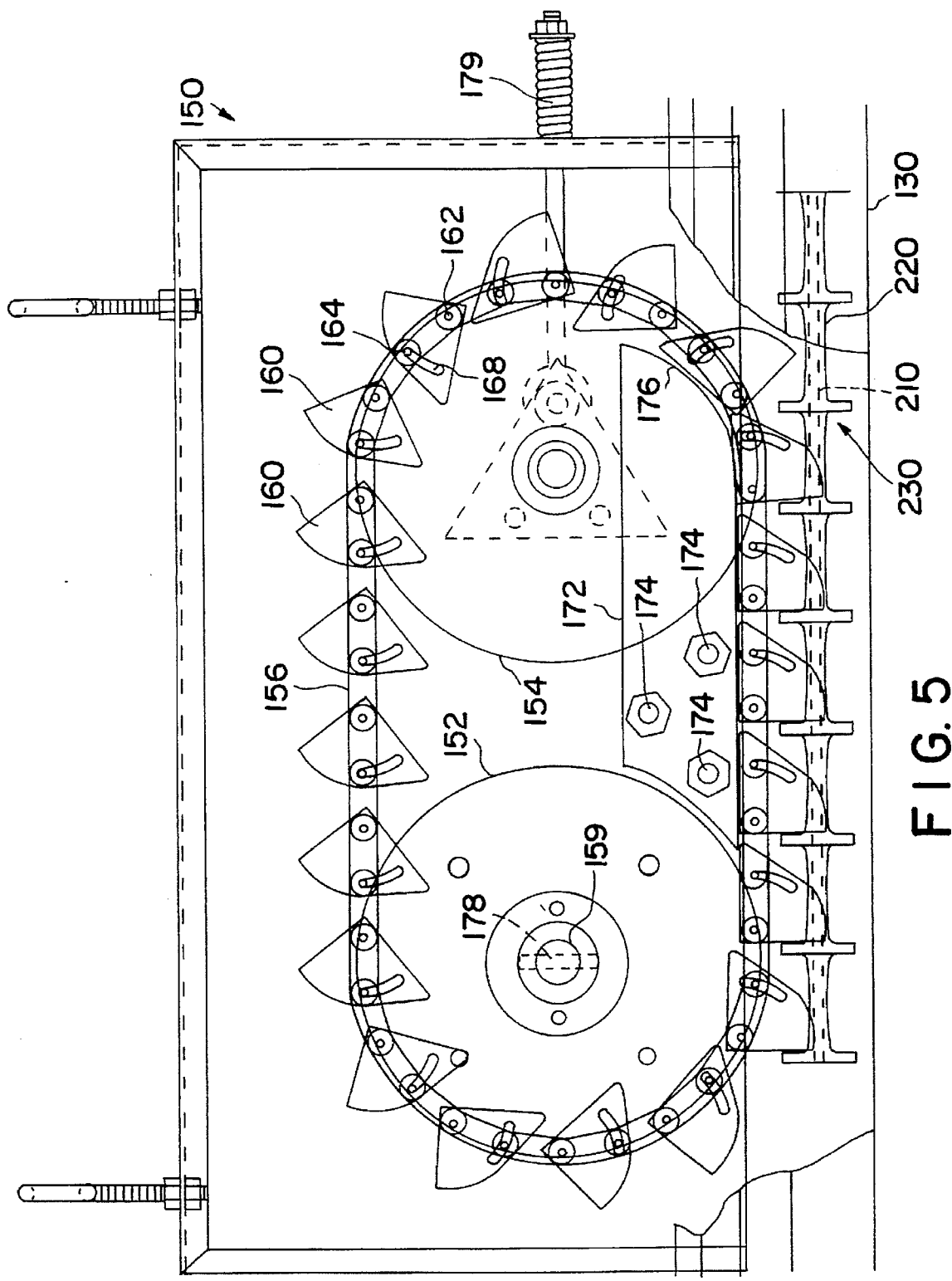
FIG. 5 shows a cross sectional side view of the drive unit of the conveyor system taken along lines 5—5 of FIG. 1.

FIG. 1 illustrates a preferred embodiment of the present invention as applied to a generic poultry feeding system 100. This system is generic in the sense that representative components of typical poultry feeding systems are shown, but not necessarily in the component quantity, orientation or dimensions used for any particular poultry feeding system. Such poultry feeding devices can be used in conventional floor systems or cage systems and have as a principle function the movement of poultry feed from a feed supply bin to the point of consumption. In actual applications, system 100 will typically be hundreds or thousands of feet in loop length.

As shown, system 100 includes as its components at least one feed input hopper 110, channel or transport tube 130, feeding trough 140 and drive unit 150. An endless, flexible conveyor 200 runs through each of those components. Hopper 110 receives feed from the supply bin either directly or through an intermediate conveyor structure. Channel 130 is connected to the bottom of hopper 110 to receive the feed and direct it to trough 140. In the specific embodiment shown, channel 130 is in the form of a tube, but various other configurations are compatible with endless conveyor 200. In certain embodiments, for example, the function of that channel can be almost entirely assumed in a longer trough. Alternatively, where a pan feeder system is used, troughs are not needed as channels 130 would run directly to the pan feeders.

Trough 140 is open at its top to enable poultry to have access to the feed at that location. Drive unit 150 engages endless conveyor 200 and provides the motive force necessary to propel the conveyor and feed in a recirculating path around system 100. Drive unit 150 is shown to be separately located from hopper 110, but in other embodiments those two components can be adjacent and/or integrated.

Endless conveyor 200 is shown in more detail in FIG. 2. The portion illustrated in this figure is repeated over the entire length of the conveyor. The conveyor is "endless" in that its ends are joined so that a loop is formed which rims continuously around the components of system 100.

Endless conveyor 200 is formed with a single strand of wire 210 as its core. Preferably, steel wire, such as oil tempered ASPM A229, having 0.162 inch diameter and 200,000 PSI tensile strength is employed. Wire 210 is covered with a sheath or coating 220 of plastic material, such as Hale Natural UNF Type 6 nylon, preferably to a thickness of at least 0.0625 inch. This coating 220 can, for example, be accomplished by injection molding of the nylon onto the wire. A plurality of disks, cups, buttons, spools or other types of projections 230 are spaced along the length of wire 210. Preferably, these discs are integrally formed with coating 220 during the injection molding process. In especially preferred embodiments, disks 230 are spaced 2 inches apart along wire 210 and project radially outward to have a diameter of 1.41 inches about the center axis 240 of conveyor 200. Also, it has been found to be advantageous for coating 220 to be approximately 0.045 inch thicker adjacent disks 230 to provide additional support for those disks, especially near the base portions 232 of the disks. In combination, wire 210, coating 220 and disks 230 are sufficiently flexible to bend around curved corners in channel 130 (or in a curved trough) as conveyor 200 is being driven around the loop of system 100.

Disks 230 are each provided with a plurality of dimples or projections 235 about their radial peripheries 237. In the embodiment shown, six such projections 235 are formed on each disk 230, each projection extending 0.050 inch outwardly from periphery 237. In other preferred embodiments eight projections can be used, typically depending on the disk diameter. The number of projections is preferably established to prevent peripheries 237 from robbing against the interior surface of channel 130 or trough 140 by spacing the disk away from that surface. Projections 235 can, for example, be integrally formed with disks 230.

Figure 8:
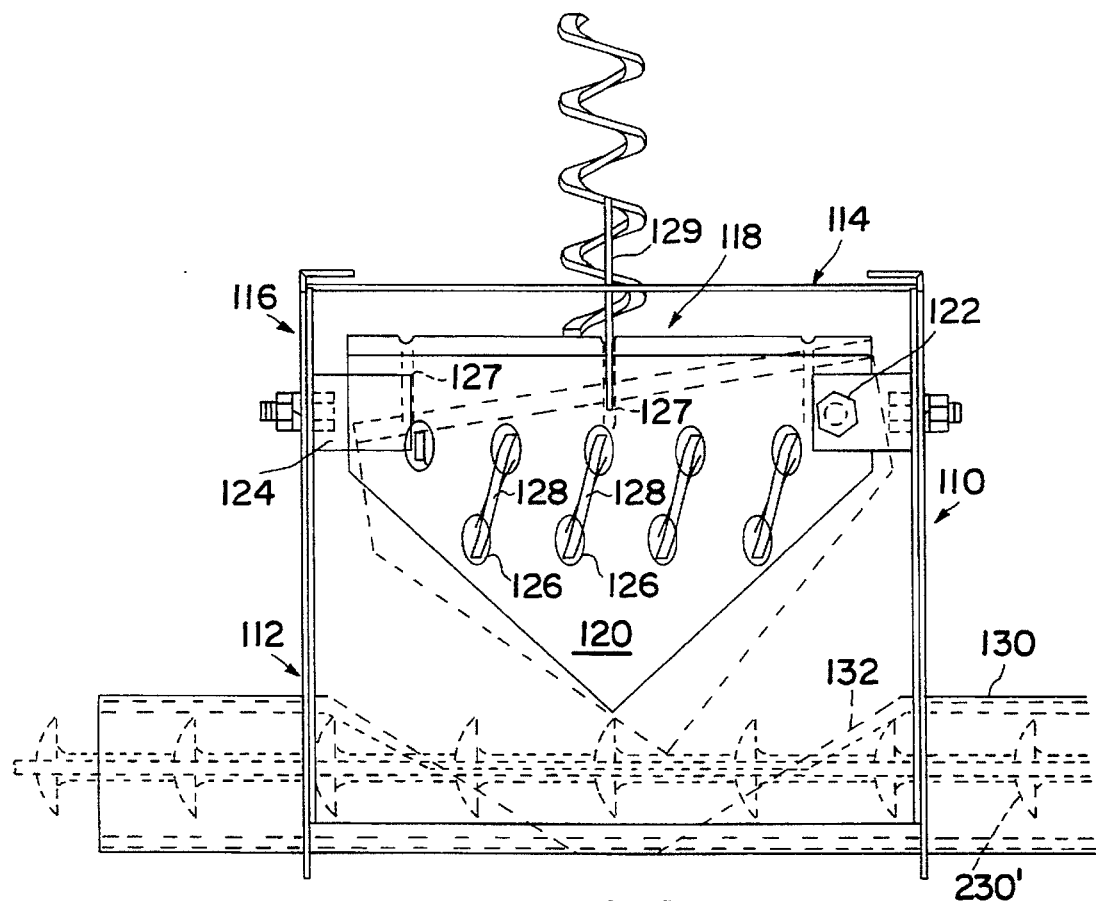
FIG. 8 shows a cross sectional side view of the input unit of the conveyor system taken along lines 8—8 of FIG. 1.

Various configurations are appropriate for disks 230. The principle purpose of the disks is to engage and transport the feed along the length of system 100. FIG. 2 shows the use of relatively flat disks 230 extending substantially radially outward from wire 210. As an alternative, FIG. 8 shows the use of curved disks or cups 230'. Similarly, projections 235 can be of any convenient configuration, a principle purpose of which being to reduce the drag and frictional forces incurred in moving the conveyor and feed through system 100. That reduction in friction is accomplished in the embodiment shown in part by reducing the surface area of contact between conveyor 200 and channel 130 and trough 140. In general, however, the dimensions of the disks and projections should take into account the smallest internal dimensions of channel 130 and trough 140, considering also that a quantity of feed is to be transported through that channel and trough as well. In the example shown in FIG. 4, the average spacing between the inside wall of channel 130 and projections 235 can be approximately 0.1 inch.

From channel 130 between hopper 110 and trough 140, conveyor 200 runs through the lower portion 142 of the trough. Above lower portion 142, the trough has outwardly flaring sides 144 formed in a conventional manner. Trough 140 is dimensioned and disposed within the poultry house so as to receive and retain a quantity of feed at locations which are readily accessible to the poultry. Typically, poultry can consume the feed through open top 146 of trough 140. Fresh feed is brought into trough 140 by conveyor 200 through bottom portion 142 and remixed with the existing supply of feed. As is conventional, the number and spacing of troughs 140 within system 100 is varied according to the size of the flock and the poultry house structure. The conveyor system of the present system is, however, readily adaptable to pre-existing troughs, such as those used to run centerless auger feeding systems.

Drive unit 150 is disposed at any convenient location within system 100, either before trough 140 or, as shown, between and after troughs 140. In a simple form, drive unit 150 could include a rotating sprocket wheel to engage disks 230 and apply motive force to conveyor 200 through those disks. In especially preferred embodiments, however, drive unit 150 includes a chain drive apparatus having drive wheel 152 and tensioning wheel 154 with lug chain 156 mounted about those wheels. Between wheels 152 and 154, a potion of lug chain 156 is preferably oriented parallel to and spaced closely apart from the path of conveyor 200. A source of rotational power, such as a gear motor 158, is connected to drive wheel 152 by axle 159. In the example shown in FIG. 5, wheels 152 and 154 are rotated clockwise by gear motor 158. Thus, lug chain 156 also moves clockwise and drives conveyor 200 clockwise with respect to the view of FIG. 1. It has been found to be advantageous to select gear motor 158 and dimension the chain drive such that conveyor 200 is so driven at a rate of between 64 and 180 feet per minute, and preferably at about 120 feet per minute.

Figure 6:
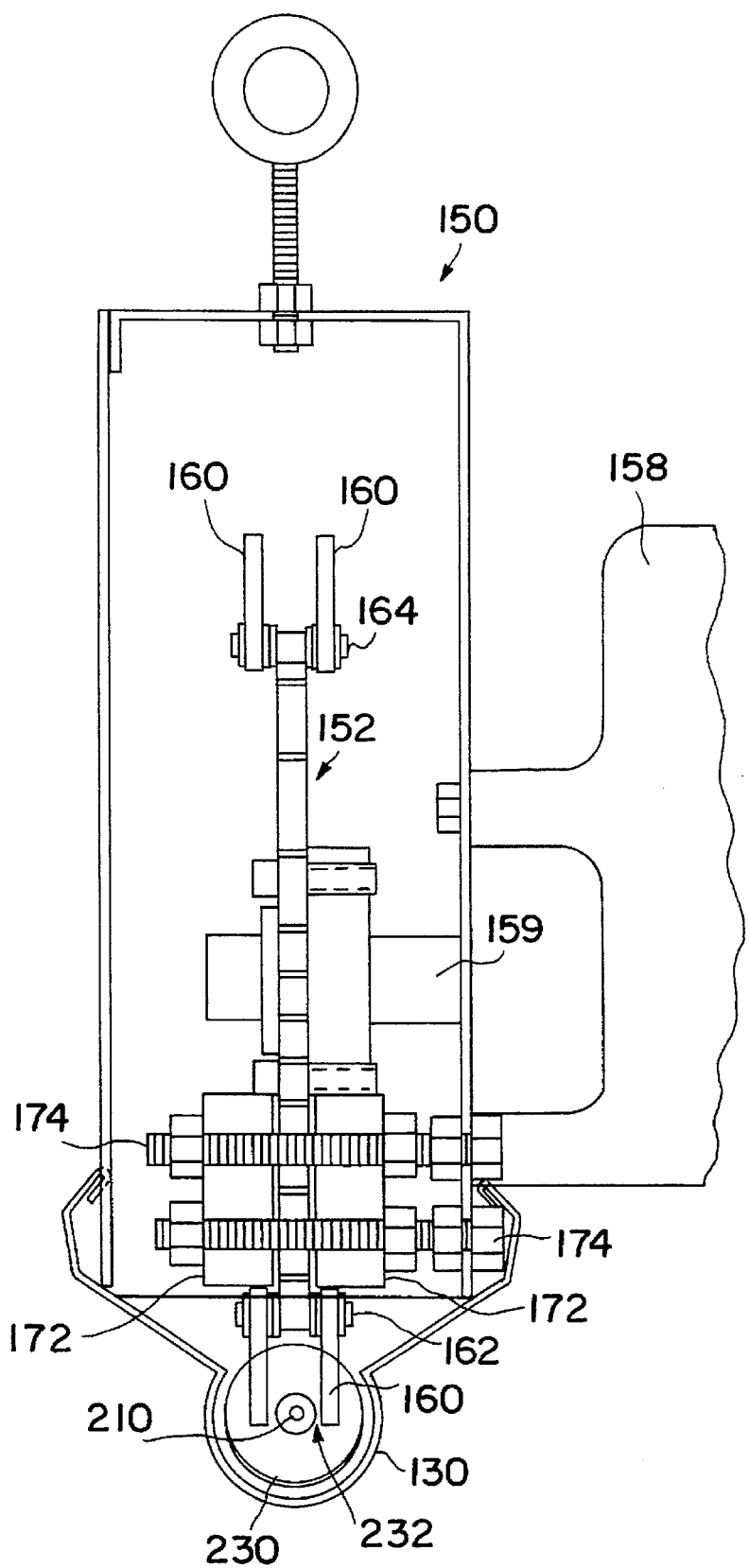
FIG. 6 shows a cross sectional end view of the drive unit of the conveyor system taken along lines 6—6 of FIG. 1.
Figure 7:
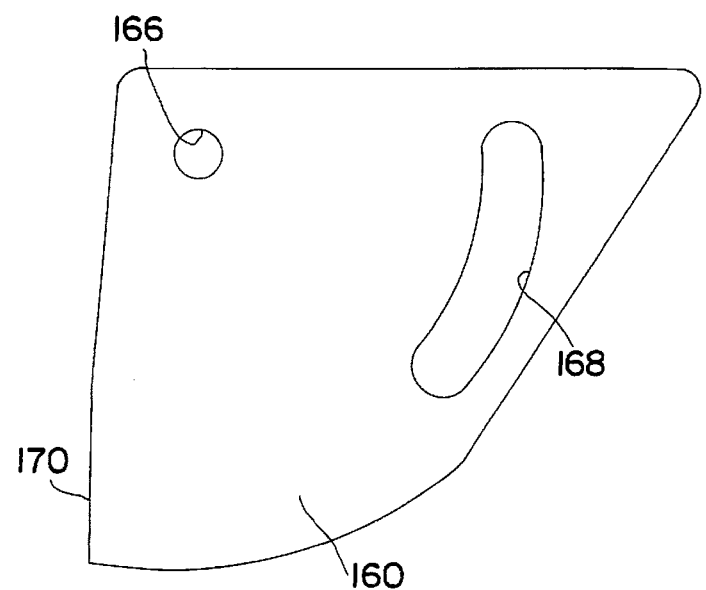
FIG. 7 shows an enlarged side view of a drive lug according to the embodiment of the present invention shown in FIG. 1.

Lug chain 156 carries a plurality of lugs 160 about its length, each lug 160 being attached to that chain in pairs by a pivot pin 162 and a slide pin 164. As shown in FIG. 7, each lug 160 is provided with an aperture 166 and a curved slot 168. A portion of each lug 160 is pivotally mounted to lug chain 156 by the insertion of pivot pin 162 through aperture 166, while at the same time another portion of lug 160 is permitted to slide with respect to lug chain 156 by the insertion of slide pin 164 into slot 168. Each lug is provided with an engagement edge 170, preferably configured to match the shape of base portion 232 of the particular style disks being used. Each pair of lugs is disposed on lug chain 156 and aligned with respect to the other lug of that pair so as to permit the engagement edges of each lug to evenly contact and apply linear motive force to a given disk 230, one lug on either side of wire 210, as seen in FIG. 6.

To reduce wear and stress on disks 230 as well as to reduce the downward forces on those disks out of the line of travel, slots 168 are preferably oriented and dimensioned with respect to lugs 160 such that motive force is not transmitted to the disks until the engagement edges contact base portion 232 of the disks closer to wire 210. At that point, the lugs are not rotating about wheels 152 or 154, but are instead traveling substantially linearly between those wheels. Blocks 172 are mounted within drive unit 150 by, for example, bolts 174 in order to assist in preventing lugs 160 from pivoting upwardly about pivot pins 162 during this period of linear motion. These blocks are preferably positioned close to lugs 160 to thereby act as "hold downs" when lugs 160 transmit motive force linearly (within the line of travel) to disks 230. In especially preferred embodiments, blocks 172 each have curved leading edges 176 to guide the orientation of lugs 160 as they come off wheel 154.

As disks 230 move past the lug chain and lugs 160 move past blocks 172 to rotate about wheels 152 or 154 out of engagement with the disks, slots 168 permit the lugs to slide away from the disks without applying undesirable stress and wear or upward motive force. In preferred embodiments, a plurality of lugs 160 will simultaneously engage and drive a plurality of disks along a common line of travel. Thus, driving force is applied to conveyor 200 primarily linearly in a direction parallel to the direction of movement of wire 210 at the location of drive unit 150. As a result, it has been found that only a single drive unit can be sufficient to propel conveyor 200 in a typical poultry feeding system of substantial length.

To facilitate practical utilization of drive unit 150 over longer periods of time, it has been found to be advantageous to include a shear pin 178 in the connection of drive wheel 152 to axle 159 such that excess tension or stress will not damage the components of this system. Similarly, it has been found to be advantageous to dispose tensioning wheel 154 as an idler for lug chain 156 under sufficient force by its tensioning spring 179 to absorb undesirable shock to conveyor 200 and drive unit 150 caused by initial start up movement.

As shown in FIG. 8, conveyor 200 passes through lower portion 112 of hopper 110. Channel 130 includes open portion 132 or is removed within hopper 110 in order for conveyor 200 to receive the feed. Hopper 110 has an opening 114 in its upper portion 116 to receive the feed from a supply or source of feed. Various conventional gates and/or flow adjustment baffles (not shown explicitly) can be mounted in upper portion 116 to control the flow of feed into hopper 110. Upper portion 116 also preferably includes a feed agitator 118 for preventing caking and clogging of the feed at the inlet to the conveyor. This agitator is driven by motion of conveyor 200.

Figure 9:
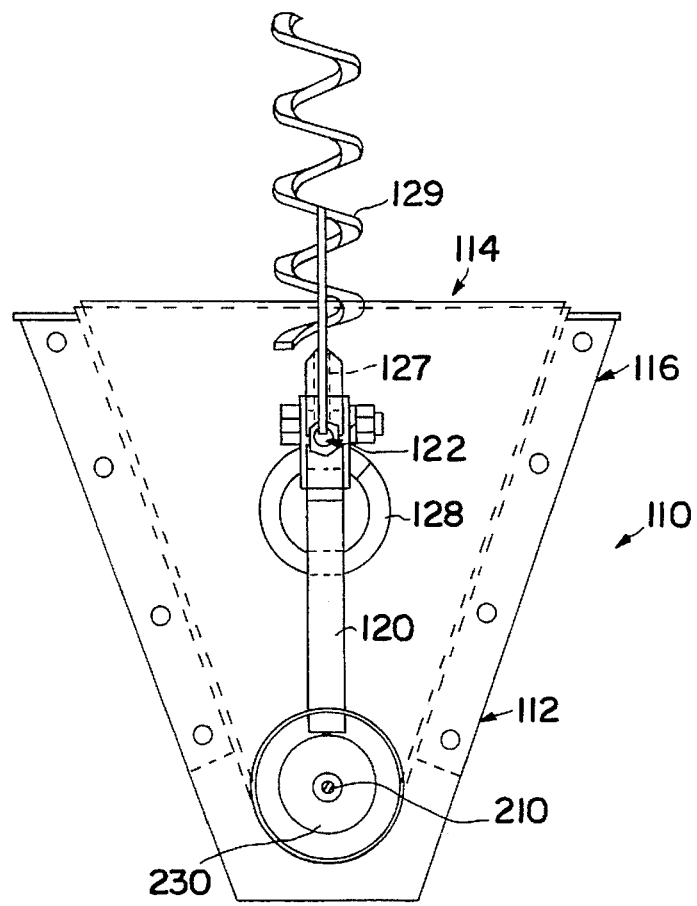
FIG. 9 shows a cross sectional end view of the input unit of the conveyor system taken along lines 9—9 of FIG. 1.

For example, if hopper 110 is configured to include a downward taper to focus feed toward conveyor 200, as shown in FIG. 9, then agitator 118 may include a vertically extending plate 120 connected by hinge 122 to an interior wall of hopper 110. Guide members 124 can be attached to an opposite interior wall of hopper 110 to assist in positive location of that plate. A plurality of apertures 126 can be formed in plate 120 to receive a spirally wound, flattened wire 128, such as a portion of a centerless auger, to create horizontal extension. Similarly, plate 120 can include slots 127 from its upper surface to receive other auger segments or like projections 129 to create vertical extension of any desired configuration. Plate 120 preferably extends downwardly such that a portion thereof rests on conveyor 200. As that conveyor is moved, plate 120 rides up and down disks 230, causing vibration and impact to loosen any feed compacted within the hopper and permit that feed to fall into the conveyor.

Figure 10:
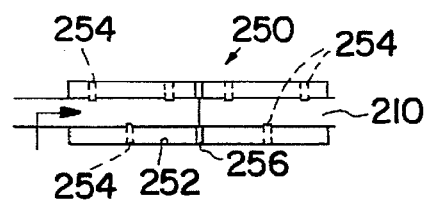
FIG. 10 shows an enlarged cross sectional view of the core wire end connection of the conveyor system of FIG. 1.

As mentioned above, conveyor 200 is "endless" in that its ends are joined to match the length of the feed loop in system 100. More specifically, in assembly coating 220 is stripped from the ends of wire 210 and a connection device is applied to join those ends, such as connector 250 shown in FIG. 10. That connector includes a sleeve 252 with a plurality of set screws 254 which can be threaded into each end of wire 210. Preferably, a sight hole 256 is formed in sleeve 252 to assist in centering the wire ends. After the wire ends are joined, the connector is covered with a shrink wrap plastic coating. It is also considered to be advantageous to include a shear pin function in the connection of these wire ends such that the ends of wire 210 will safely separate if the stress or other forces applied to wire 210 exceed a predetermined level. This can be accomplished, for example, either by the selection of the nature of the set pins or by a dedicated shear pin mounted in sleeve 252. In especially preferred embodiments, it has been found to be advantageous to keep sleeve 252 relatively short (proportionately shorter than the relative length shown in FIG. 10) in order to reduce the stresses on wire 210 at the point of end connection and reduce the incidence of wire breakage with repeated use.

Figure 11:
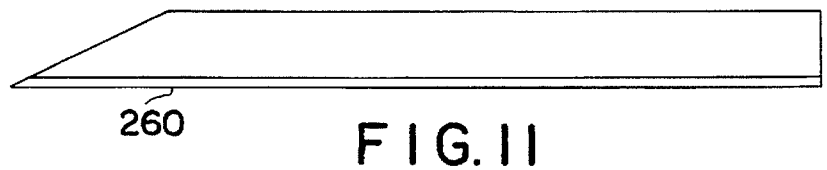
FIG. 11 shows an enlarged cross sectional side view of a feed remixing device suitable for use in the conveyor system of FIG. 1.
Figure 12:
FIG. 12 shows an end view of the feed remixing device of FIG. 11.

To encourage remixing of the feed and/or prevent riding up of conveyor 200 above older feed, a relatively short (15 inches, for example) remix sleeve 260 can be mounted at desired location(s) along trough 140. As shown in FIGS. 11 and 12, this sleeve is dimensioned to receive and retain the conveyor and can be fixed to the bottom of the trough where the less fresh feed tends to accumulate. Thus, conveyor 200 is constrained to move through this portion of the feed and transport it through sleeve 260 and into the newer feed. The input end of sleeve 260 is preferably inclined or sloped, such as at about 30 degrees from the horizontal, so as to avoid creation of a snag as projections 235 move over it to enter sleeve 260.

In order to reduce friction and decrease the power necessary to drive conveyor 200, it has been found advisable to form channel 130 and/or trough 140 from galvanized sheet metal or to apply a coating of PVC or of a similar plastic having a low coefficient of friction to those components. Thus, to clean system 100 between flocks, all of the feed contacting elements can simply be hosed down or easily washed with soap and water and sanitized with minimal concern for rusting and clogging. In that regard, to drain the washing fluids out of the system, it has been found to be advantageous to merely include a drain plug in the low point of trough 140.

Thus, it can now be seen that the present invention provides significant advantages over prior poultry feeding systems. It has been found that use of conveyor 200 permits a substantial reduction in conveyor weight. Together with the friction reducing methods, this permits a single drive unit to power the entire system and at a lower power consumption cost. Conveyor stretch has been found to be virtually eliminated, thus reducing necessary maintenance time and expertise over the useful life of the system. The use of plastics on feed contacting components and minimization of assembly components simplifies sanitation and extends the useful life of the system. This invention is readily applicable to many pre-existing trough and pan feeder systems with a minimum of component replacement needed. Further, since disks 230 are continuously connected and molded onto wire 210, slippage and disconnection of the disks along that wire can also be prevented. As a result, one of the prior causes of systems jamming is now eliminated.

Although this invention has been described in detail with respect to specific poultry feeding applications, the same is by way of illustration and example only and is not to be taken as a limitation. For example, those skilled in the art will now readily recognize that this invention can be applied to a variety of materials handling situations, such as (because of the sanitary coatings, for example) processing of food stuffs. Other applications of transporting of fluidized solids or granular material are also contemplated by the inventor. Accordingly, the present invention is limited only by the terms of the claims below.

What is claimed is:

1. A poultry feed conveyor system, comprising:
a feed retaining trough,
a feed transporting member disposed within said feed retaining trough,
said feed transporting member including an endless flexible core and a plurality of feed engaging elements spaced apart along said core,
said feed engaging elements extending generally radially outward from said core, and
said core being formed about a single strand wire joined at its ends.

2. The poultry feed conveyor system according to claim 1 wherein said core includes a coating of plastic material over the length of said core and said feed engaging elements are integrally formed with said coating.

3. The poultry feed conveyor system according to claim 2 wherein said feed engaging elements include a plurality of projections on the periphery thereof for engaging said feed retaining trough when said feed transporting member is in motion.

4. The poultry feed conveyor system according to claim 3 further including drive means engageable with said feed engaging elements for moving said feed transporting member with respect to said feed retaining trough by simultaneously applying motive force to a plurality of said feed engaging elements in a direction parallel to the direction of movement of said core at the location of said drive means.

5. The poultry feed conveyor system according to claim 4 wherein said feed retaining trough includes a feed recirculation means therein for mixing feed deposited in the lower portions thereof with feed deposited in the upper portions thereof.

6. The poultry feed conveyor system according to claim 5 wherein said feed recirculation means includes a sleeve secured to a lower portion of said feed retaining trough, said sleeve partially surrounding said feed transporting member and movably retaining said feed transporting member therein.

7. A feed conveyor system for receiving and distributing feed to animals, comprising:
a feed receptacle for retaining a quantity of feed, that receptacle being open along at least part of its length to provide access to the feed by the animals, and
a movable member within the receptacle for transporting the feed along at least a portion of the length of the receptacle,
that movable member including an endless-type flexible core having a single strand wire joined at its ends and surrounded by a flexible plastic sheath.

8. The system according to claim 7 wherein the ends of the wire are joined together with a shear pin arrangement to permit the wire to separate at a given juncture upon the application of a predetermined amount of force to the wire.

9. The system according to claim 7 wherein said movable member includes a plurality of spaced apart spools disposed along the length of said core.

10. The system according to claim 9 further including a chain drive means for propelling the moveable member through the receptacle, that chain drive means engaging a plurality of the spools simultaneously and applying motive force thereto along a common line of travel.

11. The system according to claim 10 wherein the chain drive means includes first and second rotating wheel elements with a chain member driven thereby, that chain member having a length thereof which extends generally parallel to the movable member where the chain drive means is adjacent to the movable member, the chain member also having pivotable lugs mounted thereon for engaging the spools.

12. The system according to claim 7 wherein the feed receptacle is lined with a low friction plastic material to facilitate passage of the movable member therethrough.

13. A conveyor system for fluidized solids or granular materials, comprising:
a receptacle for receiving said fluidized solids and granular materials,
a movable member disposed within said receptacle for moving said fluidized solids and granular materials within said receptacle, and
a drive means, in contact with said movable member, for applying motive force to said movable member,
said movable member including a single strand wire core with material engaging elements disposed in spaced relation upon said wire.

14. The system according to claim 13 wherein said core is covered with a continuous layer of plastic material along the portion of its length engaging said fluidized solids or granular materials, and said material engaging elements are integrally formed with said layer.

15. The system according to claim 14 wherein said material engaging elements are formed as disks extending radially from said core, those disks having a plurality of projections on the periphery thereof in order to limit the contact of said disks with said receptacle.

16. The system according to claim 13 wherein said receptacle is coated with a plastic material having a low coefficient of friction so as to facilitate movement of said movable member within said receptacle.

17. The system according to claim 13 wherein said drive means includes a drive chain mounted between a pair of rotary elements, said drive chain having a portion thereof which extends parallel with an adjacent portion of said core, said drive chain including a plurality of lugs projecting therefrom to engage said disks and simultaneously apply linear motive force to said engaged disks.

18. The system according to claim 17 further including a material input channel and an input material agitator within that channel for maintaining the fluidization or granularity of materials entering said receptacle, said agitator including means for receiving motive force from said movable member.

* * * * *